United States Patent
Luneau et al.

(10) Patent No.: US 12,080,313 B2
(45) Date of Patent: Sep. 3, 2024

(54) AUDIO SIGNAL PROCESSING METHOD AND SYSTEM FOR ENHANCING A BONE-CONDUCTED AUDIO SIGNAL USING A MACHINE LEARNING MODEL

(71) Applicant: Analog Devices International Unlimited Company, Limerick (IE)

(72) Inventors: Jean-Marc Luneau, Brussels (BE); Stijn Robben, Boutersem (BE)

(73) Assignee: Analog Devices International Unlimited Company, Limerick (IE)

( * ) Notice: Subject to any disclaimer, the term of this patent is extended or adjusted under 35 U.S.C. 154(b) by 109 days.

(21) Appl. No.: 17/852,765

(22) Filed: Jun. 29, 2022

(65) Prior Publication Data

US 2024/0005937 A1     Jan. 4, 2024

(51) Int. Cl.
    *H04R 3/04*     (2006.01)
    *G10L 15/06*     (2013.01)
    *G10L 21/0208*     (2013.01)

(52) U.S. Cl.
    CPC ........ *G10L 21/0208* (2013.01); *G10L 15/063* (2013.01); *H04R 3/04* (2013.01)

(58) Field of Classification Search
    CPC ........ H04R 3/04; H04R 1/10; H04R 2460/13; G10L 15/063; G10L 15/06; G10L 21/0208

(Continued)

(56) References Cited

U.S. PATENT DOCUMENTS 10,535,364 B1 *   1/2020   Zhong .................. G10L 25/78
11,683,632 B2 *   6/2023   Dusan .................. G10L 25/06
                                                         381/110

(Continued)

FOREIGN PATENT DOCUMENTS

EP     3737115     11/2020
EP     4044181     8/2022

(Continued)

OTHER PUBLICATIONS

Nahavandi, "Comprehensive Review of Neural Network-Based Prediction Intervals and New Advances", IEEE Transactions on Neural Networks, IEEE Transactions on Neural Networks, vol. 22, No. 9, Sep. 2011, pp. 1340-1356.

(Continued)

*Primary Examiner* — Disler Paul
(74) *Attorney, Agent, or Firm* — Schwegman Lundberg & Woessner, P.A.

(57) ABSTRACT

The present disclosure relates to an audio signal processing method implemented by an audio system which includes at least an internal sensor, wherein the audio signal processing method includes: measuring, by the internal sensor, a voice signal emitted by the user which propagates via bone-conduction to the internal sensor, thereby producing a bone-conducted audio signal; processing the bone-conducted audio signal by a machine learning model, wherein the machine learning model is previously trained to produce a predicted air-conducted audio signal which corresponds to a prediction of an audio signal that would be produced by measuring the same voice signal propagating via air-conduction to a microphone, by increasing a spectral bandwidth of the bone-conducted audio signal and/or by reshaping a spectrum of the bone-conducted audio signal; and producing an internal signal for the internal sensor based on the predicted air-conducted audio signal.

24 Claims, 4 Drawing Sheets

(58) Field of Classification Search
USPC ........................................ 381/55, 74, 92, 98
See application file for complete search history.

(56) References Cited

U.S. PATENT DOCUMENTS

| | | | | |
|---|---|---|---|---|
| 11,978,468 B2* | 5/2024 | Robben | ............... | G10L 21/0232 |
| 2022/0150627 A1* | 5/2022 | Zhou | ................... | G10L 21/0208 |

FOREIGN PATENT DOCUMENTS

| | | |
|---|---|---|
| JP | 2007240654 | 9/2007 |
| WO | 2021046796 | 3/2021 |
| WO | 2021068120 | 4/2021 |
| WO | 2022027423 | 2/2022 |
| WO | 2022236803 | 11/2022 |
| WO | 2024002896 | 1/2024 |

OTHER PUBLICATIONS

"International Application Serial No. PCT/EP2023/067121, International Search Report mailed Oct. 6, 2023", 5 pgs.
"International Application Serial No. PCT/EP2023/067121, Written Opinion mailed Oct. 6, 2023", 9 pgs.
Huang, Boyan, "A wearable bone-conducted speech enhancement system for strong background noises", 18th International Conference on Electronic Packaging Technology (ICEPT), IEEE, (Aug. 16, 2017), 1682-1684.

* cited by examiner

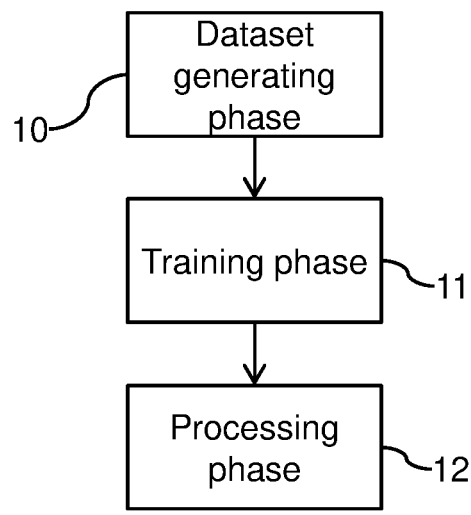
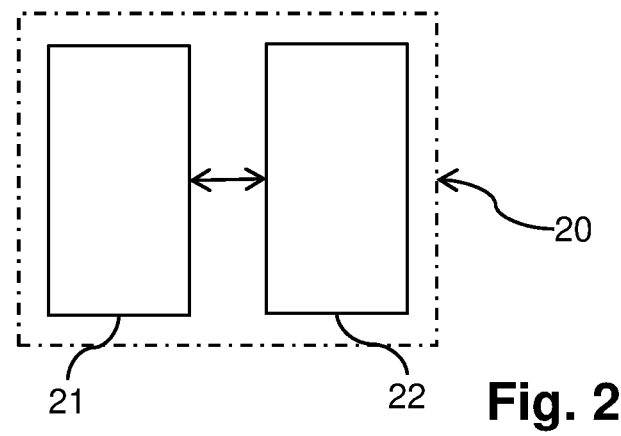
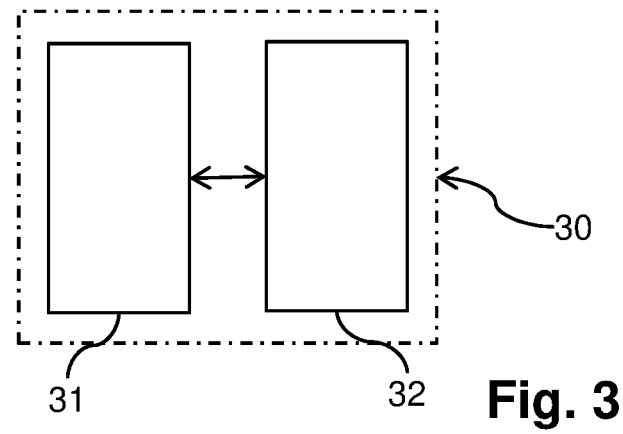

AUDIO SIGNAL PROCESSING METHOD AND SYSTEM FOR ENHANCING A BONE-CONDUCTED AUDIO SIGNAL USING A MACHINE LEARNING MODEL

BACKGROUND OF THE INVENTION

Field of the Invention

The present disclosure relates to audio signal processing and relates more specifically to a method and computing system for enhancing a bone-conducted audio signal obtained by measuring a voice of a user.

The present disclosure finds an advantageous application, although in no way limiting, in wearable devices such as earbuds or earphones or smart glasses used to pick-up voice for a voice call established using any voice communication system or for voice commands.

Description of the Related Art

To improve picking up a user's voice in noisy environments, wearable devices (like earbuds, earphones, smart glasses, helmets, etc.) are typically equipped with different types of audio sensors such as microphones and/or accelerometers.

These audio sensors are usually positioned such that at least one audio sensor, referred to as external sensor, picks up mainly air-conducted voice and such that at least another audio sensor, referred to as internal sensor, picks up mainly bone-conducted voice. External sensors are air conduction sensors (e.g. microphones), while internal sensors can be either air conduction sensors or bone conduction sensors (e.g. accelerometers).

Compared to an external sensor, an internal sensor picks up the user's voice with less ambient noise but with a limited spectral bandwidth (mainly low frequencies) and possibly distortion, such that the bone-conducted voice provided by the internal sensor can be used to enhance the air-conducted voice provided by the external sensor, and vice versa.

In most existing solutions which use both an external sensor and an internal sensor, the air-conducted voice and the bone-conducted voice are not mixed together, i.e. the audio signals of respectively the external sensor and the internal sensor are not used simultaneously in the output signal. For instance, the bone-conducted voice is used for robust voice activity detection only or for extracting metrics that assist the denoising of the air-conducted voice. Using only the air-conducted voice in the output signal has the drawback that the output signal will generally contain more ambient noise, thereby e.g. increasing conversation effort in a noisy or windy environment for the voice call use case. Using only the bone-conducted voice in the output signal has the drawback that the voice signal will generally be strongly low-pass filtered in the output signal, causing the user's voice to sound muffled thereby reducing intelligibility and increasing conversation effort.

In some existing solutions, audio signals from an internal sensor and an external sensor are mixed together for mitigating noise, by using the audio signal provided by the internal sensor mainly for low frequencies while using the audio signal provided by the external sensor for higher frequencies. However, in some cases, there might be a frequency gap between the usable low frequencies provided by the internal sensor and the usable high frequencies provided by the external sensor, such that there is a need for a solution enabling to provide audio signals usable in the middle frequencies of the frequency gap.

Also, in some cases, it might not be possible to use an audio signal from an external sensor.

For instance, in the presence of strong ambient noise (due to e.g. wind, etc.) in the audio signal provided by the external sensor, mixing the audio signals from the internal sensor and the external sensor might be insufficient to mitigate noise. In such a case, it is possible to use only the audio signal from the internal sensor, at the expense of the drawbacks mentioned above.

Also, in some cases, the wearable device may comprise only internal sensors and no external sensor at all, for instance to reduce its cost and complexity and/or to increase its waterproof ingress protection, IP, rating.

Accordingly, there is a need for a solution enabling to enhance audio signals provided by an internal sensor used for picking-up a user's voice, regardless of whether the internal sensor is used in a single audio sensor solution or in conjunction with other (external) audio sensors.

SUMMARY OF THE INVENTION

The present disclosure aims at improving the situation. In particular, the present disclosure aims at overcoming at least some of the limitations of the prior art discussed above, by proposing a solution for enhancing bone-conducted audio signals produced by internal sensors.

For this purpose, and according to a first aspect, the present disclosure relates to an audio signal processing method implemented by an audio system which comprises at least an internal sensor, wherein the internal sensor is arranged to measure acoustic signals which propagate internally to a head of a user of the audio system, the audio signal processing method comprising:

measuring, by the internal sensor, a voice signal emitted by the user which propagates via bone-conduction to the internal sensor, thereby producing a bone-conducted audio signal, processing the bone-conducted audio signal by a machine learning model, wherein the machine learning model is previously trained to produce a predicted air-conducted audio signal which corresponds to a prediction of an audio signal that would be produced by measuring the same voice signal propagating via air-conduction to a microphone, by increasing a spectral bandwidth of the bone-conducted audio signal and/or by reshaping a spectrum of said bone-conducted audio signal, producing an internal signal for the internal sensor based on the predicted air-conducted audio signal.

Hence, the present disclosure proposes to use deep learning techniques to enhance bone-conducted audio signals produced by an internal sensor. For that purpose, a machine learning model is previously trained to increase the spectral bandwidth of the bone-conducted audio signal (i.e. to artificially generate the high frequency content which has been filtered out by bone conduction) and/or to reshape the spectrum of the bone-conducted audio signal (i.e. to reduce the distortion possibly present in the original spectral bandwidth of the bone-conducted audio signal). Hence, this machine learning model is previously trained to predict an audio signal which sounds more natural, as if the voice signal had been measured by an external microphone in good signal to noise ratio, SNR, conditions.

In specific embodiments, the audio signal processing method may further comprise one or more of the following optional features, considered either alone or in any technically possible combination.

In specific embodiments, the internal signal corresponds to the predicted air-conducted audio signal.

In specific embodiments, the audio signal processing method further comprises determining at least one confidence index for the predicted air-conducted audio signal and, based on the at least one confidence index, the internal signal corresponds to one among the bone-conducted audio signal, the predicted air-conducted audio signal and a combination thereof.

In specific embodiments, the at least one confidence index is computed by comparing the predicted air-conducted audio signal with an external signal produced by an external microphone of the audio system measuring the same voice signal, wherein the external microphone is arranged to measure acoustic signals which propagate externally to the user's head.

In specific embodiments, the audio signal processing method further comprises a prior phase of training the machine learning model, said prior training phase using unsupervised learning.

In specific embodiments, the audio signal processing method further comprises a prior phase of training the machine learning model, said prior training phase using supervised learning based on a training dataset which comprises training pairs, each training pair comprising a training bone-conducted audio signal and an associated target air-conducted audio signal.

In specific embodiments, the audio signal processing method further comprises a prior phase of generating the training dataset, wherein at least one training pair is generated by measuring simultaneously a same training voice signal by a training internal sensor and by a training external microphone, thereby producing respectively the training bone-conducted audio signal and the target air-conducted audio signal.

In specific embodiments, the audio signal processing method further comprises a prior phase of generating the training dataset, wherein at least one training pair is generated by measuring a training voice signal by a training external microphone, thereby producing the target air-conducted audio signal, and by filtering the target air-conducted audio signal with a bone-conduction simulation filter, thereby producing the training bone-conducted audio signal.

In specific embodiments, the machine learning model comprises at least one among the following:
 a recurrent neural network, RNN, topology, or at least one RNN layer,
 a long-short term memory, LSTM, topology, or at least one LSTM layer,
 a convolutional neural network, CNN, topology, or at least one CNN layer,
 at least one feedforward layer,
 at least one skip connection,
 an encoder-decoder topology with at least one bottleneck layer.

In specific embodiments, the audio system further comprising an external microphone arranged to measure acoustic signals which propagate externally to the user's head, the audio signal processing method further comprises:
 measuring the same voice signal by the external sensor, thereby producing an external signal,
 producing an output signal by combining the internal signal and the external signal, and/or by denoising the external signal based on the internal signal.

In specific embodiments, the audio signal processing method further comprises determining at least one confidence index for the predicted air-conducted audio signal, wherein the output signal is produced by combining the internal signal and the external signal based on the at least on confidence index.

In specific embodiments, the at least one confidence index is computed by comparing the predicted air-conducted audio signal with the external signal.

According to a second aspect, the present disclosure relates to an audio system comprising at least an internal sensor, wherein the internal sensor is arranged to measure acoustic signals which propagate internally to a head of a user of the audio system, wherein the audio system further comprises a processing unit configured to:
 measure, by the internal sensor, a voice signal emitted by the user which propagates via bone-conduction to the internal sensor, thereby producing a bone-conducted audio signal,
 process the bone-conducted audio signal by a machine learning model, wherein the machine learning model is previously trained to produce a predicted air-conducted audio signal which corresponds to a prediction of an audio signal that would be produced by measuring the same voice signal propagating via air-conduction to a microphone, by increasing a spectral bandwidth of the bone-conducted audio signal and/or by reshaping a spectrum of said bone-conducted audio signal,
 produce an internal signal for the internal sensor based on the predicted air-conducted audio signal.

According to a third aspect, the present disclosure relates to a non-transitory computer readable medium comprising computer readable code to be executed by an audio system comprising at least an internal sensor and a processing unit, wherein the internal sensor is arranged to measure acoustic signals which propagate internally to a head of a user of the audio system, wherein said computer readable code causes said processing unit to:
 measure, by the internal sensor, a voice signal emitted by the user which propagates via bone-conduction to the internal sensor, thereby producing a bone-conducted audio signal,
 process the bone-conducted audio signal by a machine learning model, wherein the machine learning model is previously trained to produce a predicted air-conducted audio signal which corresponds to a prediction of an audio signal that would be produced by measuring the same voice signal propagating via air-conduction to a microphone, by increasing a spectral bandwidth of the bone-conducted audio signal and/or by reshaping a spectrum of said bone-conducted audio signal,
 produce an internal signal for the internal sensor based on the predicted air-conducted audio signal.

BRIEF DESCRIPTION OF THE DRAWINGS

The invention will be better understood upon reading the following description, given as an example that is in no way limiting, and made in reference to the figures which show:
FIG. 1: a diagram representing the main phases of supervised learning for a machine learning model,
FIG. 2: a schematic representation of an exemplary embodiment of a dataset generating unit,
FIG. 3: a schematic representation of an exemplary embodiment of a training unit.

Figure 4:
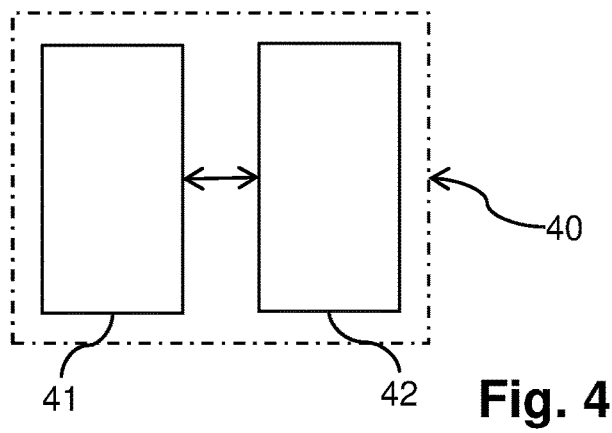
FIG. 4: a schematic representation of an exemplary embodiment of a processing unit.

In these figures, references identical from one figure to another designate identical or analogous elements. For reasons of clarity, the elements shown are not to scale, unless explicitly stated otherwise.

Also, the order of steps represented in these figures is provided only for illustration purposes and is not meant to limit the present disclosure which may be applied with the same steps executed in a different order.

DESCRIPTION OF THE PREFERRED EMBODIMENTS

As indicated above, the present disclosure relates inter alia to an audio signal processing method 60 and audio system 50 for enhancing bone-conducted audio signals produced by an internal sensor of a device wearable by a user, such as earbuds or earphones or smart glasses.

The audio signal processing method 60 and the audio system 50 use deep learning techniques to enhance bone-conducted audio signals produced by an internal sensor. For that purpose, a machine learning model is previously trained to increase the spectral bandwidth of the bone-conducted audio signal (i.e. to artificially generate the high frequency content which has been filtered out by bone conduction) and/or to reshape the spectrum of the bone-conducted audio signal (i.e. to reduce the distortion possibly present in the original spectral bandwidth of the bone-conducted audio signal).

The machine learning model is for instance trained via supervised learning. It is well known that, in such a case, the machine learning model undergoes mainly two different phases, as represented in FIG. 1:

- a training phase 11 during which the machine learning model is trained by using a training dataset,
- a processing phase 12 during which the trained machine learning model is then applied to audio signals, produced by an internal sensor, which are to be enhanced by the trained machine learning model.

As illustrated by FIG. 1, the training dataset can be generated during a dataset generating phase 10 and used during the training phase 11.

It should be noted that, in other examples, the machine learning model can be trained using unsupervised learning or semi-supervised learning. For instance, the machine learning model can be trained within a generative adversarial network (GAN) framework, etc.

In the following, we consider in a non-limitative manner that the machine learning model is trained via supervised learning.

It is emphasized that the dataset generating phase 10, the training phase 11 and the processing phase 12 can be executed separately, independently from one another, the training phase 11 receiving as input the training dataset generated during the dataset generating phase 10 and the processing phase 12 receiving as input the machine learning model trained during the training phase 11. For instance, the dataset generating phase 10 may be executed by a dataset generating unit 20, the training phase 11 may be executed by a training unit 30 and the processing phase 12 may be executed by a processing unit 40. The dataset generating unit 20, the training unit 30 and the processing unit 40 may be all separate, i.e. they may be embedded in respective separate computing systems, or two or more of the dataset generating unit 20, the training unit 30 and the processing unit 40 may be embedded in a same computing system (in which case they can share hardware resources such as processors, memories, etc.). In the present disclosure, an audio system may comprise at least one among the dataset generating unit 20, the training unit 30 and the processing unit 40, and an audio signal processing method may comprise at least one among the dataset generating phase 10, the training phase 11 and the processing phase 12.

FIG. 2 represents schematically an exemplary embodiment of a dataset generating unit 20. As illustrated by FIG. 2, the dataset generating unit 20 comprises one or more processors 21 and one or more memories 22. The one or more processors 21 may include for instance a central processing unit (CPU), a graphics processing unit (GPU), a neural processing unit (NPU), a digital signal processor (DSP), a field-programmable gate array (FPGA), an application specific integrated circuit (ASIC), etc. The one or more memories 22 may include any type of computer readable volatile and non-volatile memories (magnetic hard disk, solid-state disk, optical disk, electronic memory, etc.). The one or more memories 22 may store a computer program product, in the form of a set of program-code instructions to be executed by the one or more processors 21 in order to implement all or part of the steps of the dataset generating phase 10. Once the training dataset has been generated, it can be stored in the one or more memories 22 and/or it can be stored in a remote database (not shown in the figures) and/or it can be sent to the training unit 30.

FIG. 3 represents schematically an exemplary embodiment of a training unit 30. As illustrated by FIG. 3, the training unit 30 comprises one or more processors 31 and one or more memories 32. The one or more processors 31 may include for instance a CPU, a GPU, a NPU, a DSP, an FPGA, an ASIC, etc. The one or more memories 32 may include any type of computer readable volatile and non-volatile memories (magnetic hard disk, solid-state disk, optical disk, electronic memory, etc.). The one or more memories 32 may store a computer program product, in the form of a set of program-code instructions to be executed by the one or more processors 31 in order to implement all or part of the steps of the training phase 11 of the machine learning model used for enhancing audio signals produced by an internal sensor of a device wearable by a user. For instance, the training dataset may be stored in the one or more memories 32 after it has been retrieved from e.g. a remote database or directly from the dataset generating unit 20. Once the machine learning model has been trained, it can be stored in the one or more memories 32 and/or it can be stored in a remote database (not shown in the figures) and/or it can be sent to the processing unit 40.

FIG. 4 represents schematically an exemplary embodiment of a processing unit 40. As illustrated by FIG. 4, the processing unit 40 comprises one or more processors 41 and one or more memories 42. The one or more processors 41 may include for instance a CPU, a GPU, a NPU, a DSP, a FPGA, an ASIC, etc. The one or more memories 42 may include any type of computer readable volatile and non-volatile memories (magnetic hard disk, solid-state disk, optical disk, electronic memory, etc.). The one or more memories 42 may store a computer program product, in the form of a set of program-code instructions to be executed by the one or more processors 41 in order to enhance audio signals produced by an internal sensor of a device wearable by a user, by using a trained machine learning model. For instance, the trained machine learning model may be stored in the one or more memories 42 of the processing unit 40 after it has been retrieved from e.g. a remote database or directly from the training unit 30.

Figure 5:
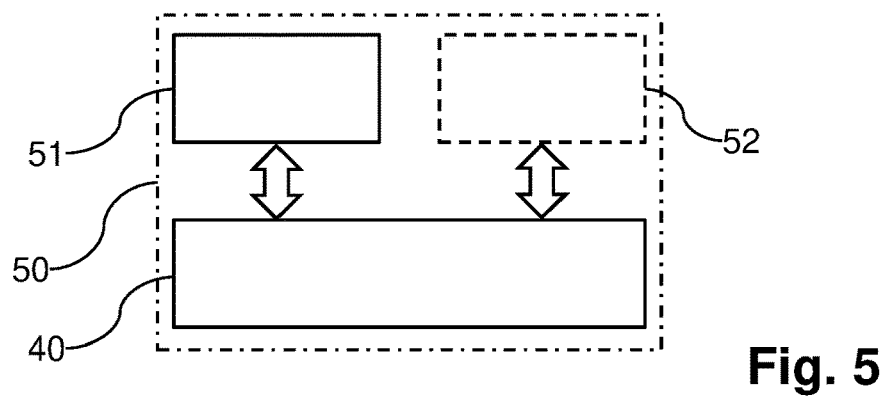
FIG. 5: a schematic representation of an exemplary embodiment of an audio system comprising an internal sensor and a processing unit embedded in a wearable audio device.

FIG. 5 represents schematically an exemplary embodiment of an audio system 50.

As illustrated by FIG. 5, the audio system 50 comprises at least one audio sensor configured to measure voice signals emitted by the user of the audio system 50, referred to as internal sensor 51. The internal sensor 51 is referred to as "internal" because it is arranged to measure acoustic signals which propagate internally through the user's head. For instance, the internal sensor 51 may be an air conduction sensor (e.g. microphone) to be located in an ear canal of a user and arranged towards the interior of the user's head, or a bone conduction sensor (e.g. accelerometer, vibration sensor). The internal sensor 51 may be any type of bone conduction sensor or air conduction sensor known to the skilled person.

In the non-limitative example illustrated by FIG. 5, the audio system 50 comprises another, optional, audio sensor referred to as external sensor 52. The external sensor 52 is referred to as "external" because it is arranged to measure acoustic signals which propagate externally to the user's head (via the air between the user's mouth and the external sensor 12). The external sensor 12 is an air conduction sensor (e.g. microphone) to be located outside the ear canals of the user, or to be located inside an ear canal of the user but arranged towards the exterior of the user's head.

As illustrated by FIG. 5, the audio system 50 comprises also a processing unit 40 as presented above, connected to the internal sensor 51 and to the external sensor 52. The processing unit 40 is configured to receive and to process the audio signals produced (output) by the internal sensor 51 and the external sensor 52.

The internal sensor 51, the external sensor 52 (if present) and the processing unit 40 are preferably all embedded in a device wearable by a user. For instance, the wearable device corresponds to earbuds, or earphones, or smart glasses, or augmented reality (AR)/virtual reality (VR)/extended reality (XR) headsets, etc.

For instance, if the wearable device of the audio system 10 corresponds to a pair of earbuds (one earbud for each ear of the user), then the internal sensor 51 is for instance arranged in a portion of one of the earbuds that is to be inserted in the user's ear, while the external sensor 52 is for instance arranged in a portion of one of the earbuds that remains outside the user's ears. It should be noted that, in some cases, the audio system 50 may comprise two or more internal sensors 51 (for instance one or two for each earbud) and/or two or more external sensors 52 (for instance one for each earbud).

Figure 6:
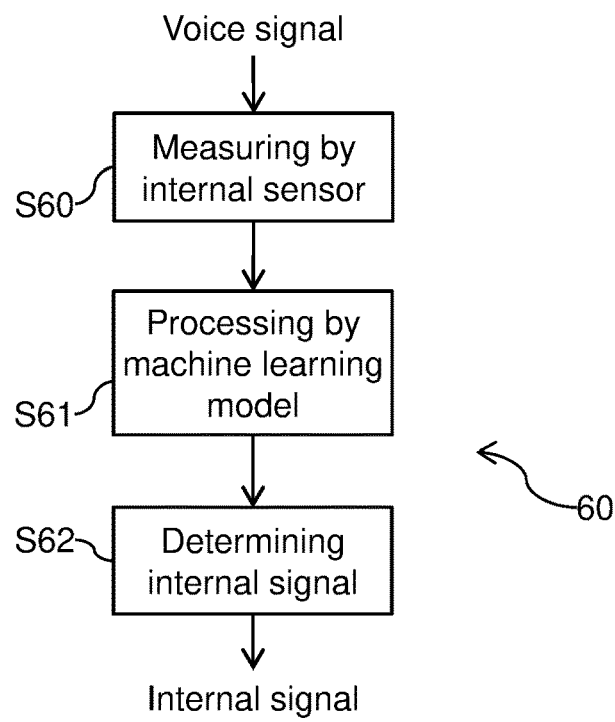
FIG. 6: a diagram representing the main steps of a first exemplary embodiment of an audio signal processing method.

FIG. 6 represents schematically the main steps of an audio signal processing method 60 for enhancing audio signals produced by the internal sensor 51, which are carried out by the audio system 50 of FIG. 5.

The audio signal processing method 60 in FIG. 6 comprises only steps relating to the processing phase 12.

As illustrated by FIG. 6, the audio signal processing method 60 comprises a step S60 of measuring, by the internal sensor 51, a voice signal emitted by the user which propagates at least via bone-conduction to the internal sensor, thereby producing an audio signal referred to as bone-conducted audio signal.

The bone-conducted audio signal may be pre-processed, for instance to reduce noise or to cancel echo, etc. Such a pre-processing is out of the scope of the present disclosure which may also be applied without pre-processing. In particular, high SNR and/or high signal to echo ratio (SER) bone conduction sensors or air conduction sensors may not need such pre-processing.

Then the audio signal processing method 60 comprises a step S61 of processing the bone-conducted audio signal by a machine learning model, executed by the processing unit 40.

The machine learning model is previously trained to produce a predicted air-conducted audio signal which corresponds to a prediction of an audio signal that would be produced by measuring the same voice signal propagating only via air-conduction to a microphone. In other words, the machine learning model aims at modifying the bone-conducted voice in the bone-conducted audio signal to produce an audio signal (referred to as predicted air-conducted audio signal) in which the voice of the user sounds like air-conducted voice in good SNR conditions. For that purpose, the machine learning model is previously trained to increase a spectral bandwidth of the bone-conducted audio signal (i.e. to artificially generate the high frequency content which has been filtered out by bone conduction) and/or to reshape a spectrum of said bone-conducted audio signal (i.e. to reduce the distortion possibly present in the original spectral bandwidth of the bone-conducted audio signal). The machine learning model may be seen as an external microphone emulator for the internal sensor 51. Since the voice in the bone-conducted audio signal is mainly bone-conducted, it is less affected by ambient noise. Hence, the predicted air-conducted audio signal determined by the machine learning model can be expected to be less affected by ambient noise than, for instance, an audio signal produced by the external sensor 52 by measuring the voice of the user, at least in the low frequencies. Hence, the bone-conducted audio signal is produced by the internal sensor 51 in good SNR conditions (typically better than for an audio signal produced by e.g. the external sensor 52) from which the predicted air-conducted audio signal will benefit.

The step S61 of processing the bone-conducted audio signal may also comprise additional processing before applying the previously trained machine learning model.

For instance, the machine learning model may be configured to receive, as input, frequency-domain signals. In such a case, the step S61 of processing the bone-conducted audio signal may comprise converting to frequency-domain the time-domain bone-conducted audio signal, by using for instance a fast Fourier transform (FFT), a discrete Fourier transform (DFT), a discrete cosine transform (DCT), a short-time Fourier transform (STFT), a wavelet transform, etc. Alternatively, or in combination thereof, the machine learning model may also be configured to receive, as input, features extracted from e.g. the frequency-domain bone-conducted audio signal, such as e.g. a spectrum centroid, a spectral bandwidth of the frequency-domain bone-conducted audio signal, mel-frequency cepstral coefficients, etc.

It should be noted that the machine learning model may also be configured to receive time-domain audio signals as input. However, in preferred embodiments, the machine learning model is configured to receive as input frequency-domain audio signals.

In the sequel, we assume in a non-limitative manner that the machine learning model is configured to receive frequency-domain signals as input. Hence, the machine learning model processes a frequency-domain bone-conducted audio signal For instance, the time-domain bone-conducted audio signal may be a signal sampled at e.g. 16 kilohertz (kHz) and buffered into time-domain audio frames of e.g. 4 milliseconds (ms). For instance, it is possible to apply on these audio frames a 128-point DCT or FFT to produce the frequency-domain bone-conducted audio signal up to the Nyquist frequency $f_{Nyquist}$, i.e. half the sampling rate (i.e. 8 kHz if the sampling rate is 16 kHz). As discussed above, the bone-conducted audio signal as typically a limited spectral bandwidth which lies mainly in [0, 1500] Hz or [0, 2000] Hz. Hence, the bone-conducted audio signal has a maximum frequency $f_{max,BC}$ above which its frequency components are negligible, with $f_{max,BC}$ for instance equal to 2000 Hz. If the internal sensor 51 is a bone conduction sensor (e.g. a vibration sensor) in an ear canal of the user, then $f_{max,BC}$ is typically in [600, 1200] Hz. If the internal sensor 51 is an air conduction sensor (e.g. a microphone) in an ear canal of the user, then $f_{max,BC}$ is typically in [600, 2500] Hz. If the internal sensor 51 is a bone conduction sensor positioned on the nose of the user (in the case of e.g. smart glasses), then $f_{max,BC}$ is typically in [600, 4000] Hz.

In the sequel, we assume in a non-limitative manner that the frequency band on which is determined the frequency-domain bone-conducted audio signal is composed of N discrete frequency values $f_n$ with $1 \leq n \leq N$, wherein $f_{min}=f_1$ corresponds to the minimum frequency and $f_{max}=f_N$ corresponds to the maximum frequency, and $f_{n-1}<f_n$ for any $2 \leq n \leq N$. For instance, $f_{min}=0$ and $f_{max}=f_{Nyquist}$, but the machine learning model may also be applied on a frequency sub-band in $[0,f_{Nyquist}]$. For instance, $f_{min}=0$ Hz and $f_{max}=4000$ Hz. The maximum frequency $f_{max}$ of the frequency band is set to be greater than the maximum frequency $f_{max,BC}$, since the machine learning model will artificially generate high frequency content above $f_{max,BC}$.

The frequency-domain bone-conducted audio signal $S_{BC}$ corresponds to a set of values $\{S_{BC}(f_n), 1 \leq n \leq N\}$ For instance, if an FFT is used, then $S_{BC}(f_n)$ corresponds to $FFT[s_{BC}](f_n)$, wherein $s_{BC}$ corresponds to the time-domain bone-conducted audio signal. Of course, this conversion is applied to successive audio frames of the time-domain bone-conducted audio signal $s_{BC}$, such that successive sets of values $\{S_{BC}(f_n), 1 \leq n \leq N\}$ are computed for successive audio frames, which represent the evolution of the frequency-domain bone-conducted audio signal over time. Hence, for each discrete frequency $f_n$, the conversion to frequency-domain may yield a temporal envelope $S_{BC}(f_n)[t]$ which represents the evolution over time of $S_{BC}(f_n)$. The machine learning model may be configured to take as input the temporal envelopes $\{S_{BC}(f_n)[t], 1 \leq n \leq N\}$ and to output temporal envelopes $\{S_{PAC}(f_n)[t], 1 \leq n \leq N\}$ which correspond to the evolution over time of the frequency-domain predicted air-conducted audio signal. Since the bone-conducted audio signal has a limited spectral bandwidth, the trained machine learning model will generate the temporal envelopes $\{S_{PAC}(f_n)[t], f_1 \leq f_n \leq f_{max}\}$ from mainly the low frequency temporal envelopes $\{S_{BC}(f_n)[t], f_1 \leq f_n \leq f_{max,BC}\}$. Hence, the high frequency temporal envelopes $\{S_{PAC}(f_n)[t], f_{max,BC} \leq f_n \leq f_{max}\}$ are artificially generated and therefore represent the spectral bandwidth expansion introduced by the machine learning model to make voice sound as if measured by an external microphone. The low frequency temporal envelopes $\{S_{PAC}(f_n)[t], f_1 \leq f_n \leq f_{max,BC}\}$ may also be reshaped with respect to the low frequency temporal envelopes $\{S_{BC}(f_n)[t], f_1 \leq f_n \leq f_{max,BC}\}$, to make voice sound as if measured by an external microphone.

The step S61 of processing the bone-conducted audio signal may also comprise additional processing after applying the previously trained machine learning model.

For instance, if the trained machine learning model is configured to output a frequency-domain predicted air-conducted audio signal, then the step S61 of processing the bone-conducted audio signal may comprise converting to time-domain the frequency-domain predicted air-conducted audio signal, by using for instance an inverse FFT (IFFT), an inverse DFT (IDFT), an inverse DCT (IDCT), an inverse STFT (ISTFT), an inverse wavelet transform, etc. It should be noted that such a conversion to time-domain, if any, may also be carried at a later stage of the processing chain.

In some cases, it is also possible to apply time-domain, or frequency-domain smoothing in order to remove possible artefacts introduced by the machine learning model and/or conventional denoising algorithms, etc.

The machine learning model is preferably a deep neural network.

Different topologies may be used for the machine learning model and the choice of a specific topology corresponds to a specific and non-limitative embodiment of the present disclosure. In preferred embodiments, the machine learning model may comprise at least one among the following:
 a RNN topology or at least one RNN layer,
 an LSTM topology or at least one LSTM layer,
 a CNN topology or at least one CNN layer,
 at least one feedforward layer,
 at least one skip connection,
 an encoder-decoder topology with at least one bottleneck layer.

Figure 7:
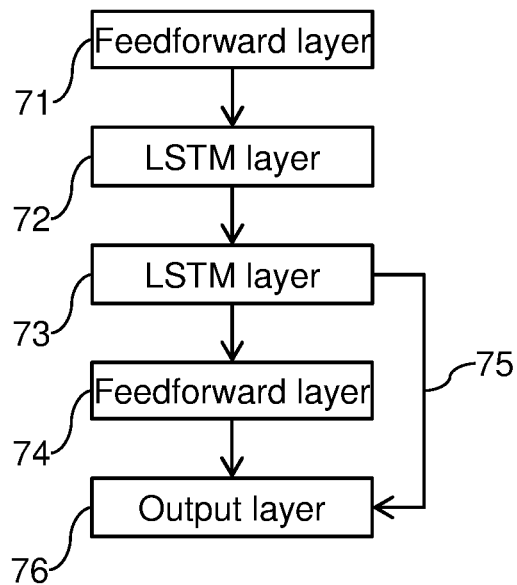
FIG. 7: a schematic representation of an exemplary embodiment of a machine learning model.

FIG. 7 represents schematically a non-limitative example of topology that may be used for the machine learning model. In the topology illustrated by FIG. 7, the machine learning model comprises a plurality of successive layers. More specifically, the machine learning model comprises an input layer 71 which corresponds for instance to a first feedforward layer. Then the machine learning model comprises a first LSTM layer 72 followed by a second LSTM layer 73. Alternatively, the first LSTM layer 72 and the second LSTM layer 73 may be replaced by one or more RNN layers. Then the machine learning model comprises a second feedforward layer 74 and a skip connection 75 skipping the second feedforward layer 74. Then the machine learning model comprises an output layer 76 which corresponds for instance to e.g. a fully connected feedforward output layer.

As illustrated by FIG. 6, the audio signal processing method 60 comprises a step S62 of determining an internal signal for the internal sensor 51 by using the predicted air-conducted audio signal, executed by the processing unit 40 of the wearable device. Basically, the internal signal corresponds to the audio signal to be used from the internal sensor 51.

It should be noted that, in some embodiments, the step S62 may consist in outputting the predicted air-conducted audio signal (possibly further processed using e.g. denoising algorithms, etc.) as the internal signal.

In other embodiments, the internal signal may be determined based on additional audio signals, for instance based on the bone-conducted audio signal produced by the internal sensor 51.

Figure 8:
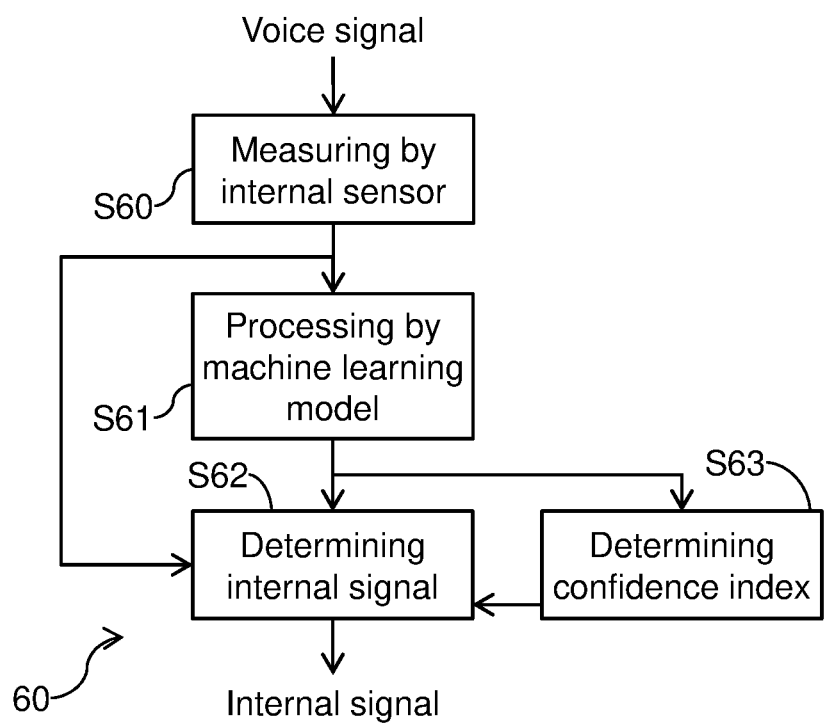
FIG. 8: a diagram representing the main steps of a second exemplary embodiment of the audio signal processing method.

FIG. 8 represents schematically the main steps of a preferred embodiment of the audio signal processing method 60. In addition to the steps discussed above in relation to FIG. 6, the audio signal processing method 60 of FIG. 8 further comprises a step S63 of determining a confidence index for the predicted air-conducted audio signal. Basically, the confidence index is representative of an estimated accuracy/reliability of the predicted air-conducted audio signal. Based on the confidence index, the internal signal corresponds to one among the bone-conducted audio signal, the predicted air-conducted audio signal and a combination thereof.

For instance, if the confidence index indicates that the predicted air-conducted audio signal is likely to be accurate, then the internal signal may correspond to the predicted air-conducted audio signal. In turn, if the confidence index indicates that the predicted air-conducted audio signal is likely to be inaccurate, then the internal signal may correspond to the bone-conducted audio signal. Between these two cases (predicted air-conducted audio signal likely inaccurate or accurate), it is possible, in some cases, to combine the bone-conducted audio signal with the predicted air-conducted audio signal. For instance, a weighted sum may be used to combine the bone-conducted audio signal with the predicted air-conducted audio signal. This combination can be carried out in time-domain and/or in frequency-domain.

For instance, it is possible to determine successive confidence indexes for successive audio frames of the predicted air-conducted audio signal, to vary over time the composition of the internal signal (bone-conducted audio signal or predicted air-conducted audio signal or combination thereof) based on the determined confidence indexes. In some embodiments, it is also possible to compute a plurality of confidence indexes for each audio frame of the predicted air-conducted audio signal, for instance one confidence index per discrete frequency $f_n$ or group of discrete frequencies. In such a case, it is possible to vary over frequency the composition of the internal signal (bone-conducted audio signal or predicted air-conducted audio signal or combination thereof) based on the determined confidence indexes.

Different methods may be used for determining such confidence indexes representative of the estimated accuracy/reliability of the predicted air-conducted audio signal, and the choice of a specific method corresponds to a specific and non-limitative embodiment of the present disclosure. For instance, the confidence index for the predicted air-conducted audio signal may be computed using prediction intervals (see e.g. [KHOSRAVI2011]), by looking at the variance of the outputs of the trained machine learning model. If the variance is high, then the confidence index should indicate that the predicted air-conducted audio signal is likely to be inaccurate. In turn, if the variance is low, then the confidence index should indicate that the predicted air-conducted audio signal is likely to be accurate.

Figure 9:
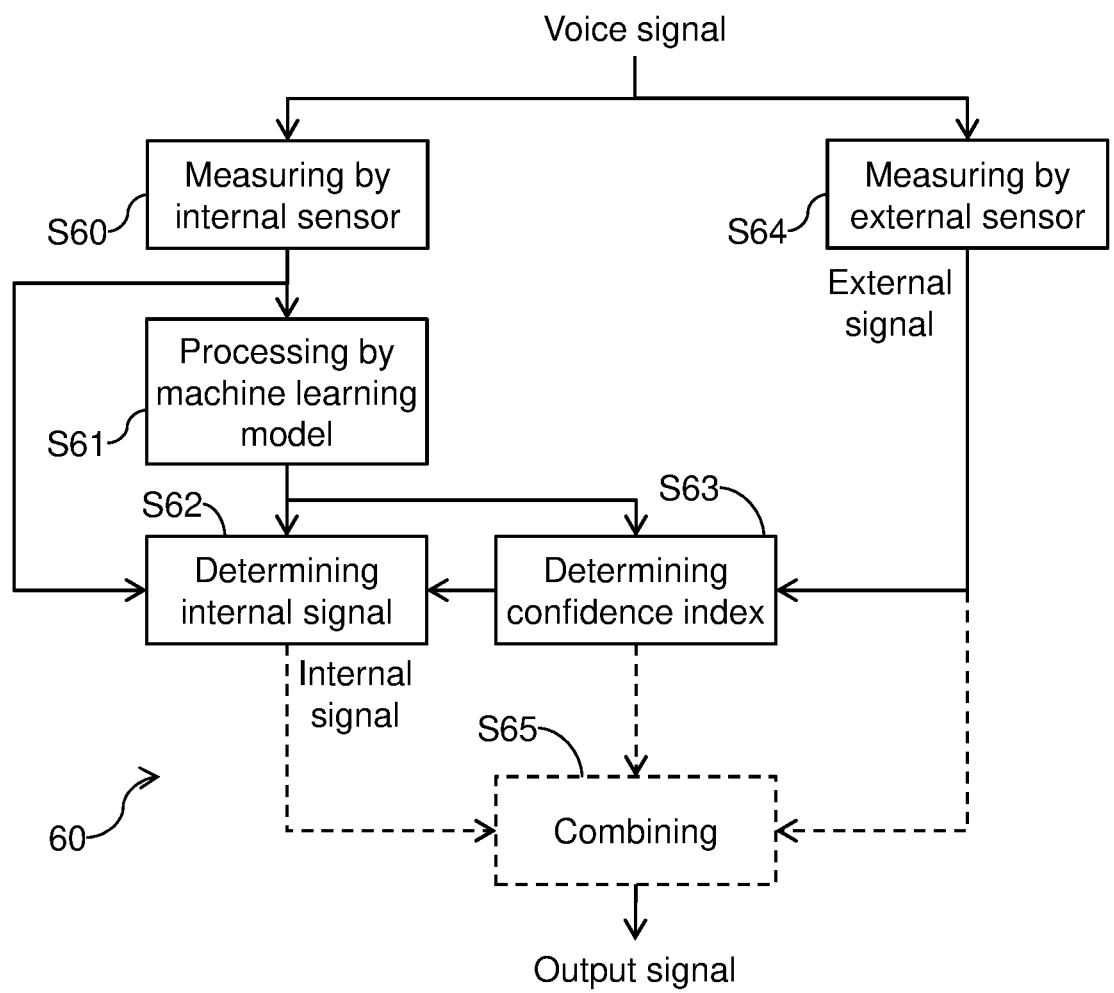
FIG. 9: a diagram representing the main steps of a third exemplary embodiment of the audio signal processing method.

FIG. 9 represents schematically the main steps of a preferred embodiment of the audio signal processing method 60, in which the one or more confidence indexes are computed by comparing the predicted air-conducted audio signal with a reference audio signal. In addition to the steps discussed above in relation to FIG. 8, the audio signal processing method 60 of FIG. 8 further comprises a step S64 of measuring, by the external sensor 52, the voice signal emitted by the user, thereby producing an audio signal referred to as external signal. If the audio system 50 comprises two or more external sensors 52, the external signal may be produced by combining (e.g. beamforming, etc.) the audio signals provided by the external sensors 52. As discussed above, the voice in the external signal is mainly air-conducted (but affected by ambient noise) such that it can be used as reference audio signal for the predicted air-conducted audio signal since the bone-conducted audio signal and the external signal are produced by measuring simultaneously the same voice signal emitted by the user of the wearable device. Accordingly, the one or more confidence indexes may be determined, during step S63, by comparing the predicted air-conducted audio signal with the external signal. The confidence index may e.g. be any measure of the similarity of the two audio signals (e.g. a coherence or cross-correlation measurement), in frequency-domain or in time-domain. In such a case, if the predicted air-conducted audio signal and the external signal are similar, the predicted air-conducted audio signal can be considered to be likely accurate, and vice versa. For instance, it is known to use a loss function during the training phase 11 of the machine learning model, which will be discussed hereinbelow, and the comparison may use the same loss function for comparing the predicted air-conducted audio signal and the external signal.

Hence, the proposed audio signal processing method 60 enhances bone-conducted audio signals produced by internal sensors, by using a machine learning model previously trained to increase a spectral bandwidth of the bone-conducted audio signal and/or to reshape a spectrum of said bone-conducted audio signal. Hence, as such, the internal signal may be used to improve the performance of different applications, including the applications which may use only the internal signal from the internal sensor 51 (e.g. speech recognition, VAD, speech level estimation, etc.).

In some embodiments, it is also possible to combine the internal signal with the external signal produced by the external sensor 52 (if any). In such a case, and as illustrated in a non-limitative manner by FIG. 9, the audio signal processing method 60 further comprises an optional step S65 of producing an output signal by combining the external signal with the internal signal, executed by the processing unit 40. For instance, the output signal is obtained by using the internal signal below a cutoff frequency and using the external signal above the cutoff frequency. Typically, the output signal may be obtained by:

low-pass filtering the internal signal based on the cutoff frequency, high-pass filtering the external signal based on the cutoff frequency, adding the respective results of the low-pass filtering of the internal signal and of the high-pass filtering of the external signal to produce the output signal.

It should be noted that the combining of the external audio signal with the filtered internal audio signal may be performed in temporal domain or in frequency domain.

For instance, the cutoff frequency may be a static frequency, which is preferably selected beforehand.

According to another example, the cutoff frequency may be dynamically adapted to e.g. the actual noise conditions. For instance, the setting of the cutoff frequency may use the method described in U.S. patent application Ser. No. 17/667,041, filed on Feb. 8, 2022, the contents of which are hereby incorporated by reference in its entirety.

In the non-limitative embodiment of FIG. 9, the internal signal is determined based on the bone-conducted audio signal and the predicted air-conducted audio signal and based further on one or more confidence indexes.

It should be noted that combining the internal signal and the external signal may also be performed when no confidence indexes are determined and/or when the internal signal produced during step S62 consists in the predicted air-conducted audio signal.

In some embodiments, it is possible to determine one or more confidence indexes for the predicted air-conducted audio signal, as discussed above. In such a case, the one or more confidence indexes may be used when producing the output signal. For instance, the one or more confidence indexes may be used to dynamically adapt the cutoff frequency. For instance, the cutoff frequency may be higher when the predicted air-conducted audio signal is likely to be accurate than when it is likely to be inaccurate. In the non-limitative example of FIG. 9, the one or more confidence indexes are used for both determining the internal signal (to arbitrate between the bone-conducted audio signal and the predicted air-conducted audio signal, during step S62) and when producing the output signal (to adapt the cutoff frequency, during step S65). In other examples, it is also possible to use such one or more confidence indexes only for producing the output signal.

In some embodiments, it is also possible to use the internal signal to denoise the external signal produced by the external sensor 52 (if any). For instance, the internal signal and the external signal may be converted to frequency domain, thereby producing an internal spectrum and an external spectrum, respectively. These spectra are complex spectra, i.e. each value of a spectrum is a complex value having a magnitude value and a phase value. It is possible to generate an output spectrum of the output signal by modifying the magnitude values of the external spectrum based on the magnitude values of the internal spectrum, and by using the phase values of the external spectrum. However, any denoising method known to the skilled person can be used.

As discussed above, the machine learning model is previously trained during the training phase 11 which is executed by the training unit 30. In general, the training unit 30 is separate from the wearable device which includes the processing unit 40.

As discussed above, in some examples, the training phase 11 can use supervised learning based on a training dataset. It should be noted that the training phase 11 may use any supervised learning scheme known to the skilled person, and the choice of a specific supervised learning scheme corresponds to a specific non-limitative embodiment of the present disclosure.

In preferred embodiments, the training dataset comprises training pairs. Each training pair comprises for instance:
- a training bone-conducted audio signal, and
- an associated target air-conducted audio signal.

The training dataset comprises a plurality of training pairs which differ by one or more parameters. For instance, the one or more parameters which vary from one training pair to another may include:
- a voice level in the training pair,
- characteristics of the voice signal (e.g. by considering different training users),
- a noise level in the training bone-conducted audio signal,
- a noise type (e.g. white noise, colored noise, etc.) in the training bone-conducted audio signal, etc.

The training bone-conducted audio signal corresponds to an audio signal which includes bone-conducted voice (with limited spectral bandwidth), and the target air-conducted audio signal corresponds to a "ground truth" audio signal representative of the expected enhanced version of the training bone-conducted audio signal to be obtained when using the machine learning model. The target air-conducted audio signal corresponds to an audio signal with good SNR conditions (e.g. no noise). The training bone-conducted audio signal may also correspond to an audio signal with good SNR conditions, or it can be mixed with noise to make the machine learning model robust to the possible presence of noise in the bone-conducted audio signal of the internal sensor 51.

For instance, during the training phase 11, the machine learning model is iteratively updated for each training pair in order to optimize a predefined loss function, until a predefined stop criterion is satisfied. For each training pair, the loss function compares an audio signal, obtained by processing the training bone-conducted audio signal with the machine learning model, with the expected target air-conducted audio signal. Typically, regardless its topology, the machine learning model is defined by a set of parameters, and the training phase 11 aims at identifying optimal values for this set of parameters, i.e. values of the set of parameters which optimize the loss function. Hence, the comparison of the audio signal, obtained by processing the training bone-conducted audio signal with the machine learning model, with the expected target air-conducted audio signal, is used to compute updating parameters for the machine learning model. Updating parameters are modifications to the set of parameters which, in principle, should cause the machine learning model to generate audio signals which further reduce the loss function value. Such updating parameters may be determined in a conventional manner by e.g. gradient descent methods. This iterative process is repeated for each training pair of the training dataset.

In preferred embodiments, the loss function used during the training phase 11 (and possibly in the processing phase 12 to compute confidence indexes) corresponds to a mean spectral approximation (MSA) loss function (complex or real), or to a mean squared error (MSE) loss function, or to a mean absolute error (MAE) loss function, using e.g. L1 or L2 norms, etc. It is also possible to include in the loss function an additional term based on a POLQA (perceptual objective listening quality analysis) or MOS (mean opinion score) score of the output, such that maximizing the score tends to optimize the loss function. Other loss functions may be used, e.g. magnitude based, and the choice of a specific loss function corresponds to a specific non-limitative embodiment of the present disclosure.

As discussed above, the training dataset is previously generated during the dataset generating phase 10 which is executed by the dataset generating unit 20. In general, the dataset generating unit 20 is separate from the wearable device which includes the processing unit 40.

For instance, a training pair may be generated by measuring simultaneously a training voice signal emitted by a training user with a training internal sensor and a training external microphone of the dataset generating unit 20. The training internal sensor is arranged such that the training voice signal propagates mainly or only via bone-conduction to the training internal sensor. The training external microphone is arranged such that the training voice signal propagates mainly or only via air-conduction to the training external microphone. Hence the audio signal output by the training internal sensor corresponds to the training bone-conducted audio signal of the training pair, while the audio signal output by the training external microphone corresponds to the target air-conducted audio signal of the training pair. Preferably, the training internal sensor should have substantially the same characteristics as the internal sensor 51 which will be used during the processing phase 12.

Alternatively, or in combination thereof, a training pair may be generated by measuring a training voice signal emitted by a training user by a training external microphone of the dataset generating unit 20. The training external microphone is arranged such that the training voice signal propagates mainly or only via air-conduction to the training external microphone, and the audio signal output by the training external microphone corresponds to the target air-conducted audio signal of the training pair. Then, the training bone-conducted audio signal of the training pair is obtained by filtering the target air-conducted audio signal of the training pair by a predetermined bone-conduction simulation filter. Basically, the bone-conduction simulation filter is a low-pass filter which reduces the spectral bandwidth of the target air-conducted audio signal to simulate bone-conduction. Such a filtering may also be applied to preexisting audio files, without having to actually measure voice signals by using a training external microphone.

As discussed above, the machine learning model may assume that the audio signals to be processed have a predetermined format.

For instance, the machine learning model may be configured to process time-domain audio signals having a predetermined target sampling rate, e.g. 16 kHz. During the training phase 11, the training pairs should be sampled at the target sampling rate that will be used during the processing phase 12. Hence, the training pair may for instance be generated at the target sampling rate during the dataset generating phase 10, or it can be resampled at the target sampling rate during the training phase 11. Similarly, the training phase 11 should use audio frames having the same number of samples as in the processing phase 12.

According to another example, the machine learning model may be configured to receive as input frequency-domain audio signals and/or features extracted from audio signals. During the training phase 11, the training pairs should be in frequency-domain and/or should include such extracted features. Hence, the training pair may for instance be converted to frequency-domain during the dataset generating phase 10, or it can be converted to frequency-domain during the training phase 11. The conversion to frequency-domain should use the same transforms as in the processing phase 12 (type of transform e.g. FFT or DCT, windowing, size of the transform e.g. 128-point, etc.). Similarly, the features may for instance be extracted during the dataset generating phase 10, or during the training phase 11, by using the same feature extraction algorithms as in the processing phase 12.

It is emphasized that the present disclosure is not limited to the above exemplary embodiments. Variants of the above exemplary embodiments are also within the scope of the present invention.

The above description clearly illustrates that by its various features and their respective advantages, the present disclosure reaches the goals set for it.

The proposed solution can be applied in wearable devices such as wired or wireless earbuds, headsets, (smart) glasses or other wearable devices that are in physical contact with the user's head, neck or torso.

For instance, the proposed solution may be used for applications such as voice calling or voice commands.

The proposed solution may also be used for devices meant to identify a user from his or her bone conduction signature. Every person has a unique skull bone structure and tissues, which combined with a relatively unique voice production makes it possible to identify or authenticate a user. The bone conduction capture provides very different results if done on a nose (e.g. smart glasses) or in the ear or around the concha. This variety makes it difficult to predict the actual signal capture bandwidth. In that context this invention allows for bone conduction bandwidth extension, providing higher bandwidth resulting audio signals allowing for a better, more accurate, identification.

REFERENCES

[KHOSRAVI2011] A. Khosravi, S. Nahavandi, D. Creighton and A. F. Atiya, "Comprehensive Review of Neural Network-Based Prediction Intervals and New Advances," in IEEE Transactions on Neural Networks, vol. 22, no. 9, pp. 1341-1356, September 2011, doi: 10.1109/TNN.2011.2162110.

The invention claimed is:

1. An audio signal processing method implemented by an audio system which comprises at least an internal sensor, wherein the internal sensor is arranged to measure acoustic signals which propagate internally to a head of a user of the audio system, wherein the audio signal processing method comprises:
   generating a training dataset, wherein at least one training pair is generated by measuring a training voice signal by a training external microphone, thereby producing a target air-conducted audio signal, and by filtering the target air-conducted audio signal with a bone-conduction simulation filter, thereby producing a training bone-conducted audio signal;
   training a machine learning model using supervised learning based on the training dataset which comprises training pairs, each training pair comprising the training bone-conducted audio signal and an associated target air-conducted audio signal;
   measuring, by the internal sensor, a voice signal emitted by the user which propagates via bone-conduction to the internal sensor, thereby producing a bone-conducted audio signal,
   processing the bone-conducted audio signal by the machine learning model, wherein the machine learning model is previously trained using the training dataset to produce a predicted air-conducted audio signal which corresponds to a prediction of an audio signal that would be produced by measuring the same voice signal propagating via air-conduction to a microphone, by increasing a spectral bandwidth of the bone-conducted audio signal and/or by reshaping a spectrum of said bone-conducted audio signal, and
   producing an internal signal for the internal sensor based on the predicted air-conducted audio signal.

2. The audio signal processing method according to claim 1, wherein the internal signal corresponds to the predicted air-conducted audio signal.

3. The audio signal processing method according to claim 1, further comprising determining at least one confidence index for the predicted air-conducted audio signal, wherein, based on the at least one confidence index, the internal signal corresponds to one among the bone-conducted audio signal, the predicted air-conducted audio signal and a combination thereof.

4. The audio signal processing method according to claim 3, wherein the at least one confidence index is computed by comparing the predicted air-conducted audio signal with an external signal produced by an external microphone of the audio system measuring the same voice signal, wherein the external microphone is arranged to measure acoustic signals which propagate externally to the user's head.

5. The audio signal processing method according to claim 3, wherein determining the at least one confidence index for the predicted air-conducted audio signal includes:
  determining, using a variance of the predicted air-conducted audio signal, the at least one confidence index for the predicted air-conducted audio signal.

6. The audio signal processing method according to claim 1, further comprising a prior phase of generating the training dataset, wherein at least one training pair is generated by measuring simultaneously a same training voice signal by a training internal sensor and by a training external microphone, thereby producing respectively the training bone-conducted audio signal and the target air-conducted audio signal.

7. The audio signal processing method according to claim 1, wherein the machine learning model comprises at least one among the following:
  a recurrent neural network, RNN, topology, or at least one RNN layer,
  a long-short term memory, LSTM, topology, or at least one LSTM layer,
  a convolutional neural network, CNN, topology, or at least one CNN layer,
  at least one feedforward layer,
  at least one skip connection, and
  an encoder-decoder topology with at least one bottleneck layer.

8. The audio signal processing method according to claim 1, wherein the audio system further comprises an external microphone arranged to measure acoustic signals which propagate externally to the user's head, further comprising:
  measuring the same voice signal by the external sensor, thereby producing an external signal, and
  producing an output signal by combining the internal signal and the external signal, and/or by denoising the external signal based on the internal signal.

9. The audio signal processing method according to claim 8, further comprising determining at least one confidence index for the predicted air-conducted audio signal, wherein the output signal is produced by combining the internal signal and the external signal based on the at least on confidence index.

10. The audio signal processing method according to claim 1, comprising:
  pre-processing the bone-conducted audio signal so as to reduce noise and/or cancel echo.

11. An audio system comprising at least an internal sensor, wherein the internal sensor is arranged to measure acoustic signals which propagate internally to a head of a user of the audio system, wherein the audio system further comprises a processing unit configured to:
  generate a training dataset, wherein at least one training pair of the training dataset is generated by measuring a training voice signal by a training external microphone, thereby producing a target air-conducted audio signal, and by filtering the target air-conducted audio signal with a bone-conduction simulation filter, thereby producing a training bone-conducted audio signal,
  perform a prior training of a machine learning model by using supervised learning based on the training dataset which comprises training pairs, wherein each training pair comprises the training bone-conducted audio signal and an associated target air-conducted audio signal,
  measure, by the internal sensor, a voice signal emitted by the user which propagates via bone-conduction to the internal sensor, thereby producing a bone-conducted audio signal,
  process the bone-conducted audio signal by the machine learning model, wherein the machine learning model is previously trained to produce a predicted air-conducted audio signal which corresponds to a prediction of an audio signal that would be produced by measuring the same voice signal propagating via air-conduction to a microphone, by increasing a spectral bandwidth of the bone-conducted audio signal and/or by reshaping a spectrum of said bone-conducted audio signal, and
  produce an internal signal for the internal sensor based on the predicted air-conducted audio signal.

12. The audio system according to claim 11, wherein the internal signal corresponds to the predicted air-conducted audio signal.

13. The audio system according to claim 11, wherein the processing unit is further configured to determine at least one confidence index for the predicted air-conducted audio signal, wherein, based on the at least one confidence index, the internal signal corresponds to one among the bone-conducted audio signal, the predicted air-conducted audio signal and a combination thereof.

14. The audio system according to claim 13, wherein the processing unit is configured to compute said at least one confidence index by comparing the predicted air-conducted audio signal with an external signal produced by an external microphone of the audio system measuring the same voice signal, wherein the external microphone is arranged to measure acoustic signals which propagate externally to the user's head.

15. The audio system according to claim 13, wherein the processing unit configured to determine the at least one confidence index for the predicted air-conducted audio signal is configured to:
  determining, using a variance of the predicted air-conducted audio signal, the at least one confidence index for the predicted air-conducted audio signal.

16. The audio system according to claim 11, further comprising a dataset generating unit configured to generate the training dataset, wherein at least one training pair is generated by measuring simultaneously a same training voice signal by a training internal sensor and by a training external microphone, thereby producing respectively the training bone-conducted audio signal and the target air-conducted audio signal.

17. The audio system according to claim 11, wherein the machine learning model comprises at least one among the following:
  a recurrent neural network, RNN, topology, or at least one RNN layer,
  a long-short term memory, LSTM, topology, or at least one LSTM layer,
  a convolutional neural network, CNN, topology, or at least one CNN layer,
  at least one feedforward layer,
  at least one skip connection, and an encoder-decoder topology with at least one bottleneck layer.

18. The audio system according to claim 11, wherein the audio system further comprises an external microphone arranged to measure acoustic signals which propagate externally to the user's head, wherein the processing unit is further configured to:
- measure, by the external sensor, the same voice signal as the voice signal measured by the internal sensor, thereby producing an external signal, and
- produce an output signal by combining the internal signal and the external signal, and/or by denoising the external signal based on the internal signal.

19. The audio system according to claim 18, wherein the processing unit is further configured to determine at least one confidence index for the predicted air-conducted audio signal, wherein the output signal is produced by combining the internal signal and the external signal based on the at least one confidence index.

20. The audio system according to claim 11, wherein the processing unit is configured to:
- pre-processing the bone-conducted audio signal so as to reduce noise and/or cancel echo.

21. A non-transitory computer readable medium comprising computer readable code to be executed by an audio system comprising at least an internal sensor and a processing unit, wherein the internal sensor is arranged to measure acoustic signals which propagate internally to a head of a user of the audio system, wherein said computer readable code causes said processing unit to:
- generate a training dataset, wherein at least one training pair of the training dataset is generated by measuring a training voice signal by a training external microphone, thereby producing a target air-conducted audio signal, and by filtering the target air-conducted audio signal with a bone-conduction simulation filter, thereby producing a training bone-conducted audio signal,
- perform a prior training of a machine learning model by using supervised learning based on the training dataset which comprises training pairs, wherein each training pair comprises the training bone-conducted audio signal and an associated target air-conducted audio signal,
- measure, by the internal sensor, a voice signal emitted by the user which propagates via bone-conduction to the internal sensor, thereby producing a bone-conducted audio signal,
- process the bone-conducted audio signal by a machine learning model, wherein the machine learning model is previously trained to produce a predicted air-conducted audio signal which corresponds to a prediction of an audio signal that would be produced by measuring the same voice signal propagating via air-conduction to a microphone, by increasing a spectral bandwidth of the bone-conducted audio signal and/or by reshaping a spectrum of said bone-conducted audio signal, and
- produce an internal signal for the internal sensor based on the predicted air-conducted audio signal.

22. The non-transitory computer readable medium of claim 21, wherein the computer readable code causes the processing unit to:
- determine at least one confidence index for the predicted air-conducted audio signal, wherein, based on the at least one confidence index, the internal signal corresponds to one among the bone-conducted audio signal, the predicted air-conducted audio signal and a combination thereof.

23. The non-transitory computer readable medium of claim 22, wherein the computer readable code that causes the processing unit to determine the at least one confidence index for the predicted air-conducted audio signal causes the processing unit to:
- determine, using a variance of the predicted air-conducted audio signal, the at least one confidence index for the predicted air-conducted audio signal.

24. The non-transitory computer readable medium of claim 21, wherein the computer readable code causes said processing unit to:
- pre-process the bone-conducted audio signal so as to reduce noise and/or cancel echo.

* * * * *